United States Patent
Tat

(10) Patent No.: US 12,483,743 B2
(45) Date of Patent: Nov. 25, 2025

(54) ENHANCED REMOTE-CONTROL OF A DIGITAL MEDIA SYSTEM

(71) Applicant: ARRIS ENTERPRISES LLC, Suwanee, GA (US)

(72) Inventor: Nguyen C. Tat, Carlsbad, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 595 days.

(21) Appl. No.: 17/232,707

(22) Filed: Apr. 16, 2021

(65) Prior Publication Data

US 2021/0352366 A1 Nov. 11, 2021

Related U.S. Application Data

(60) Provisional application No. 63/016,497, filed on Apr. 28, 2020.

(51) Int. Cl.
*H04N 5/445* (2011.01)
*A01H 6/08* (2018.01)
*G06V 40/20* (2022.01)
*H04N 21/422* (2011.01)

(52) U.S. Cl.
CPC ....... *H04N 21/42203* (2013.01); *A01H 6/088* (2018.05); *G06V 40/20* (2022.01)

(58) Field of Classification Search
CPC ....... H04N 21/42203; H04N 21/42224; A01H 6/088; G06V 40/20
See application file for complete search history.

(56) References Cited

U.S. PATENT DOCUMENTS

| | | | |
|---|---|---|---|
| 8,490,131 B2* | 7/2013 | Sugiyama | H04N 21/4341 725/18 |
| 10,311,149 B1* | 6/2019 | Yang | G06F 40/51 |
| 10,477,277 B2* | 11/2019 | Cormican | H04N 21/4722 |
| 2008/0036849 A1* | 2/2008 | Oh | H04N 7/147 345/2.1 |
| 2011/0090407 A1* | 4/2011 | Friedman | H04N 21/422 348/734 |
| 2013/0050118 A1* | 2/2013 | Kjelsbak | G06F 3/017 345/173 |
| 2014/0025750 A1* | 1/2014 | Dawar | H04M 1/72436 709/206 |
| 2017/0017304 A1* | 1/2017 | Kang | G06F 3/02 |
| 2018/0067641 A1* | 3/2018 | Lerner | H04L 51/52 |
| 2019/0370545 A1* | 12/2019 | Josephson | G06V 40/20 |

* cited by examiner

*Primary Examiner* — Annan Q Shang
(74) *Attorney, Agent, or Firm* — Panitch Schwarze Belisario & Nadel LLP

(57) ABSTRACT

A system and method supporting the direct entry of characters by sensing and analyzing user motion. This motion can be the movement of one or more fingers or of a stylus over a touchpad integrated into a remote-control unit, or the motion of a remote-control unit itself tracked by a motion sensor. The sensed motions correspond to patterns representing one or more characters, words, phrases, or commands. Information indicative of the patterns is then analyzed by the system and translated into a corresponding characters, commands or actions. This translated information is then provided to a digital media system as an input or a command.

31 Claims, 3 Drawing Sheets

ENHANCED REMOTE-CONTROL OF A DIGITAL MEDIA SYSTEM

CROSS-REFERENCE TO RELATED APPLICATION

This application claims the benefit of U.S. Provisional Patent Application No. 63/016,497, filed Apr. 28, 2020, which is incorporated by reference herein in its entirety.

BACKGROUND OF THE INVENTION

As a consequence of the advent of digital television, broadband Internet, video streaming services, and the enhanced level of connectivity (both wired and wireless) available to consumers, line separating residential televisions from personal computer systems has all but been eliminated. It is not unusual for a consumer to use their digital television monitor, digital set-top box or other digital media controller to access social media, send and receive e-mail and text messages, order on-demand video or audio selections, or shop on-line. Such activity can often require a consumer to enter alphanumeric characters for purposes of specifying the content they are ordering, signing onto and providing a password for a social media account, composing an e-mail or text message, or accessing, ordering and providing payment information to an on-line marketplace.

Unfortunately, most smart television systems, digital set-top boxes, and digital media receivers (hereinafter referred to collectively as "digital media systems") are controlled via hand-held remote-control unit ("RCU") that lacks an alphanumeric keyboard and is ill-adapted for entering a sequence of such characters. The various on-line service providers and merchants have addressed this deficiency by providing on-screen keyboards or matrices of alphanumeric characters that a consumer can navigate using the directional control buttons found on most handheld RCUs. While systems based on such directional navigation of alphanumeric characters are useable, they are also prone to error (it is easy to overshoot the desired character when navigating a screen of alphanumeric characters) and very time consuming to use. For users that are accustomed to entering characters via a physical keyboard, the experience of using an RCU-based directional system for anything beyond entering a very few characters can be quite frustrating. In addition, all of the above drawbacks and difficulties are amplified if the system is using a non-alphabetic language such the logosyllabic characters of the Chinese, Japanese and Korean languages. The number of characters required for such languages can be unmanageably large.

Although voice-response systems can offer a consumer an alternate method of entering long or complex words or phrases, such systems are not compatible with many digital media systems. Furthermore, voice response systems are often unsuitable for uncommon words or symbols (such as those found in usernames, e-mail addresses or passwords), can be unreliable in high-noise environments, and not afford a consumer any degree of privacy, both in the immediate area where the command is being spoken, and beyond (most voice response systems transmit any received commands over the Internet to a remote system for analysis and recognition).

Consequently, there is a need for a system and method enabling the convenient and efficient entry of characters into digital media systems.

BRIEF SUMMARY OF THE INVENTION

A system and method supporting the direct entry of characters by sensing and analyzing user motion. This motion can be the movement of one or more fingers or of a stylus over a touchpad integrated into an RCU, or the motion of an RCU itself tracked by a motion sensor. The sensed motions correspond to patterns representing one or more characters, words, phrases, or commands. Information indicative of the patterns is then analyzed by the system and translated into a corresponding characters, commands or actions. This translated information is then provided to the digital media system as an input or a command.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
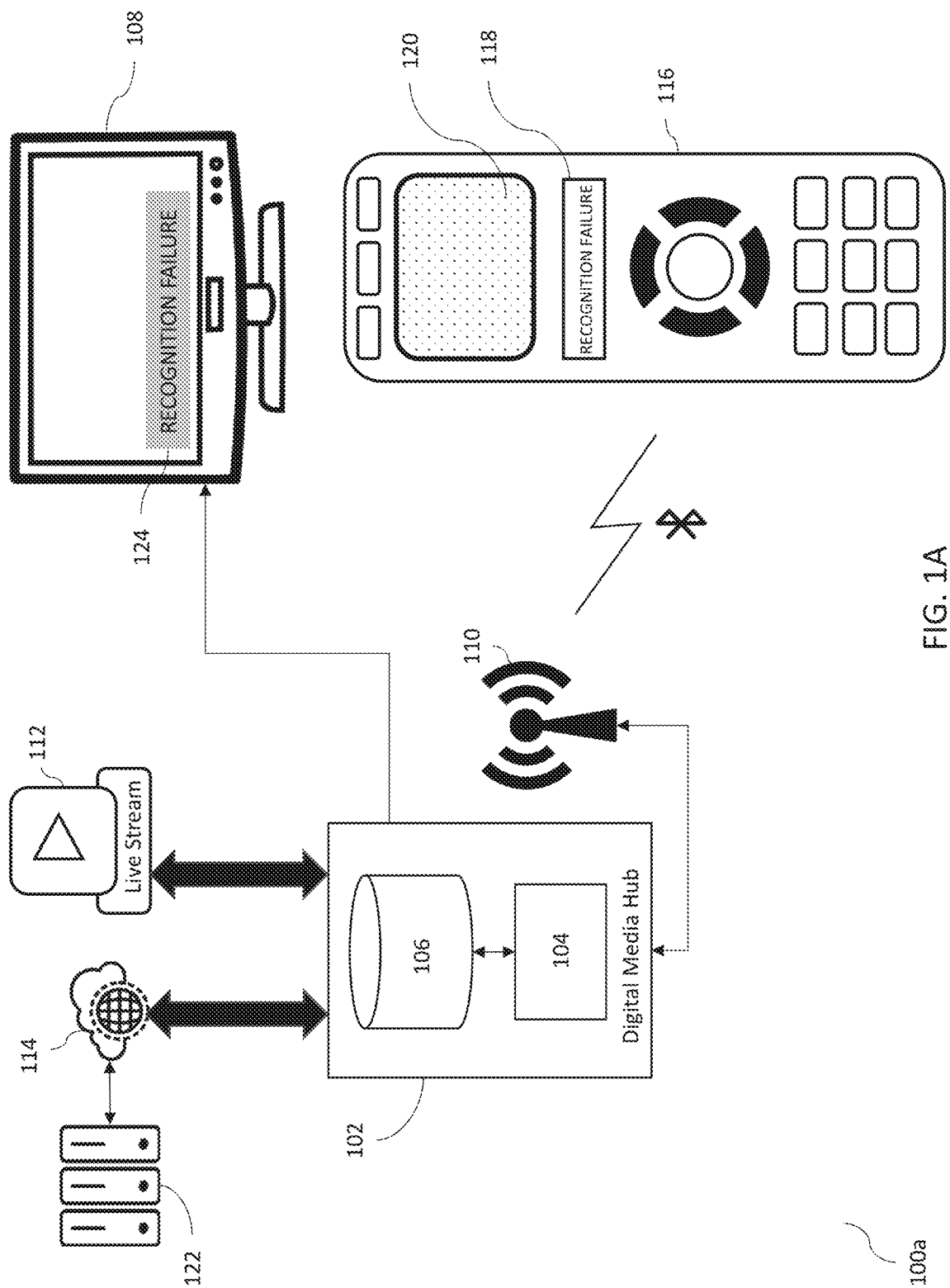
FIG. 1A is a functional block diagram of a system supporting a first preferred embodiment of an enhanced-remote control system utilizing a touch pad.

FIG. 1A is a functional diagram depicting a first preferred embodiment of an enhanced-remote control system for use with a digital media system. As shown, system 100a includes digital media controller 102, which adapted to interface with various devices (either via a wired or wireless means) to provide users with access to digital content (video, audio, images, etc.). Digital media controller 102 includes processor 104 (which has at least one digital processor), and memory 106. This digital media controller may be implemented via a general-purpose personal computer, a dedicated appliance (such as a set-top box or other consumer premises equipment), or via an off-site device connected to the customer premises via a private or public network.

Digital media controller 102 is shown to be interfaced with digital television 108, and Bluetooth® transceiver 110, cable/optical content provider 112 and Internet provider 114. In addition, RCU 116 is communicatively linked to digital media controller 102 via a bidirectional Bluetooth connection supported by Bluetooth transceiver 110. RCU 116 includes display 118 and touchpad 120. Touchpad 120 is adapted to generate information in response to and indicative of the motion of a stylus or user's finger moving along the pad's surface. Touchpad technology is well-known in the art and will not be discussed in detail in this description.

Processor 104 serves to control and direct incoming and outgoing media to and from digital media controller 102, including video, image and audio associated with cable/optical content provider 112 and/or Internet provider 114. In addition, processor 104 receives from RCU 116 information indicative of finger or stylus motion. This received motion information is then processed and analyzed for character/pattern recognition. This recognition analysis results in the received motion information being translated into one or more characters or commands. The recognition analysis can include the comparison of the received motion information to predetermined patterns, and utilize artificial intelligence, convolutional neural networks, or other recognition and pattern analysis techniques known in the art.

This recognition processing and analysis can be performed locally utilizing processor 104 and information stored in memory 106. However, this may not practical due to limitations of digital media controller 102's computing and storage capabilities. Consequently, processor 104 can be adapted to forward the motion information received from RCU 116 to off-site server 122 via Internet provider 114. Off-site server 122 processes the received motion information and transmits the results back to digital media controller 102 and processor 104.

Regardless of the where the recognition analysis is performed, upon the completion of an effective translation, information indicative of one or more characters and/or commands is made available to processor 104. Processor 104 then executes the appropriate action or actions in response to this character/command information. However, the particular action or actions executed by processor 104 once character/command information is made available can be made dependent upon information stored in memory 106 and/or the state of digital media controller 102.

For example, memory 106 can store user-specific information indicative of certain user preferences and user-specific information. Such information may include user passwords or financial information such as credit or debit card numbers. If the character/command information made available to processor 102 was the instruction "Enter Jane's debit card number", processor 104 would retrieve that number from memory 106 and cause the characters comprising that debit card number to be provided or entered in accordance with the state of media controller 102. If media controller 102 were in a state supporting the display of a particular e-commerce or media on-demand payment screen on digital television 108, the retrieved number would be entered into an active or selected field on that screen. It will be understood, that this use-specific information could also be stored off-site in a memory accessible by digital media controller 102 via a public or a private network.

The character/command information made available to processor 102 could also cause an on-screen cursor to move to or select a particular on-screen option associated with or indicated by the character/command information. Of course, if the character/command information simply represented a single character of string of characters, processor 104 would cause that/those character(s) to be entered into an active or selected field on that screen.

System 100a provides a user with feedback regarding the system's failure to recognize a recently analyzed finger/stylus motion or hand gesture. If processor 104 or remote server 122 cannot successfully recognize received motion information as corresponding to one or more characters, commands or actions, processor 104 will generate an error message (124) to be displayed on the screen being presently displayed on digital television 108. This on-screen message can be presented as a picture-in-picture, an overlay, a chyron or text. The on-screen message can inform the user that his or her last motions or gestures were not understood by the system and need to be reattempted. Alternatively, processor 102 could direct an instruction indicative of a motion failure recognition to RCU 116 via Bluetooth transceiver 110. Upon receiving this instruction, RCU 116 would display an error message via display 118 and/or vibrate so as to notify the user of the recognition failure.

Figure 1B:
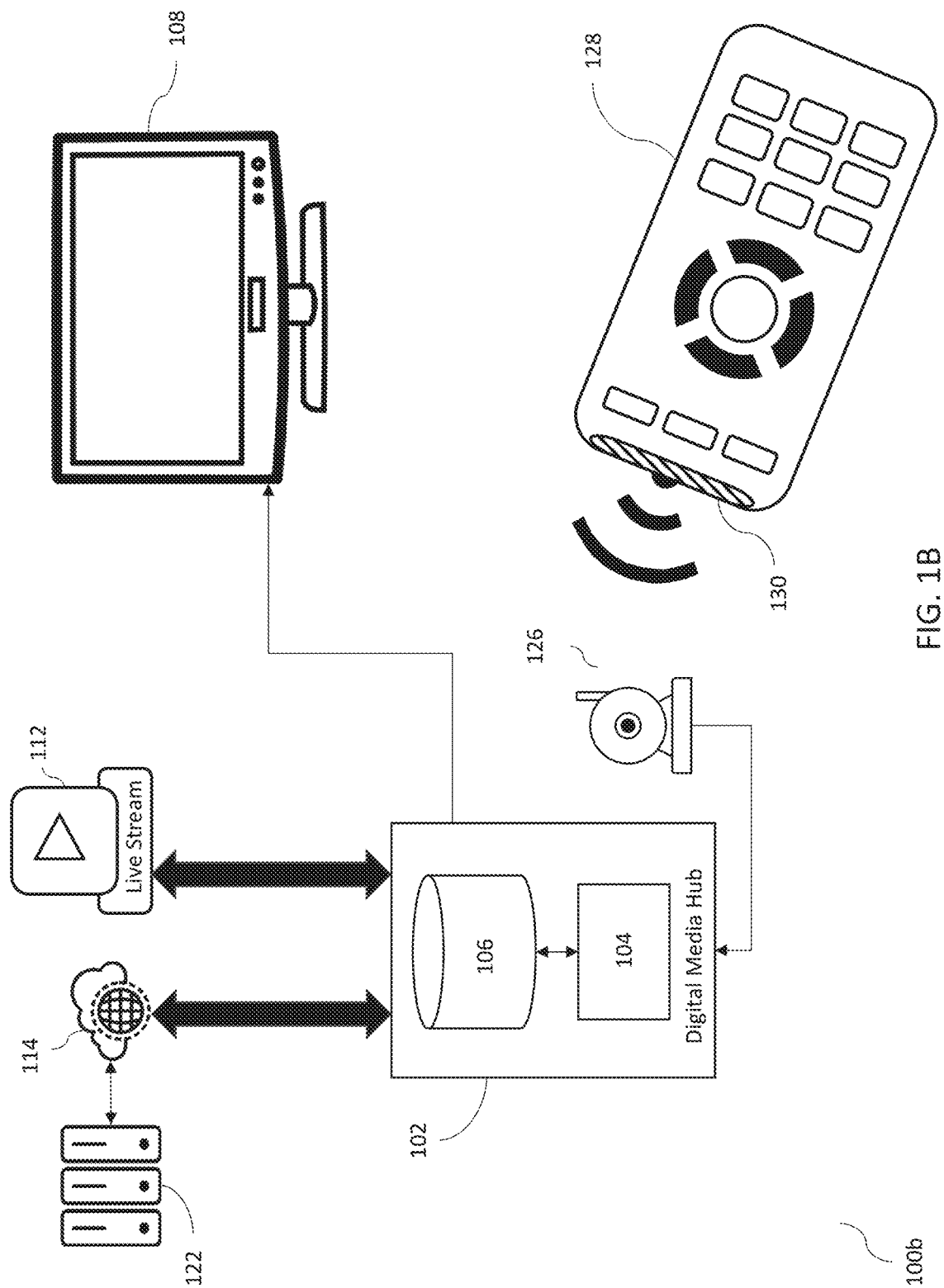
FIG. 1B is a functional block diagram of a system supporting a second preferred embodiment of an enhanced-remote control system utilizing an optical motion sensor.

FIG. 1B provides a functional diagram depicting a second preferred embodiment of an enhanced-remote control system for use with a digital media controller. Like-numbered elements in system 100b operate in a manner similar to those of the system 100a (see FIG. 1A). However, unlike system 100a, system 100b includes infrared ("IR") sensor 126, which is interfaced with digital media controller 102. IR sensor 126 can be a camera or any sensor capable or sensing the position of an IR emitter as it traverses the sensor's field-of-view.

In addition, system 100b includes RCU 128 into which IR emitter 130 is integrated. IR emitter 130 is adapted, when activated, to emit an IR optical signal (continuous or pulsed) that enables IR sensor 126 to track the motion of RCU 128 within IR sensor 126's field-of-view. After activating emitter 130, a user may make particular gestures with the hand in which RCU 128 is being held so as to indicate one or more characters or commands intended to be communicated to digital media controller 102. IR sensor tracks the motion of IR emitter 130 as these hand gestures are made and generates information indicative of such. Optical motion-sensing technology is well-known in the art and will not be discussed in detail in this description. Processor 104 receives information indicative of the motion of RCU 128. This received information is then processed by system 100b in a manner similar to that in which system 100a processed the touch pad information, and information indicative of one or more characters and/or commands is made available to processor 104.

Processor 104 then executes the appropriate action or actions in response to this character/command information and system 100b responds to these commands in a manner similar of system 100a causing processor 104 then executes the appropriate action or actions.

System 100b also can provide a user with feedback regarding the system's failure to recognize a recently analyzed RCU motion. Digital media could communicate such an error message to RCU 128 via a wires or optical link, the details of which are not shown in FIG. 1B, nor will they be discussed here. Such wireless and optical communication linkages are well known in the art. RCU 128 would respond by vibrating or providing some visual indicator so as to alert the user to the recognition failure.

Figure 1C:
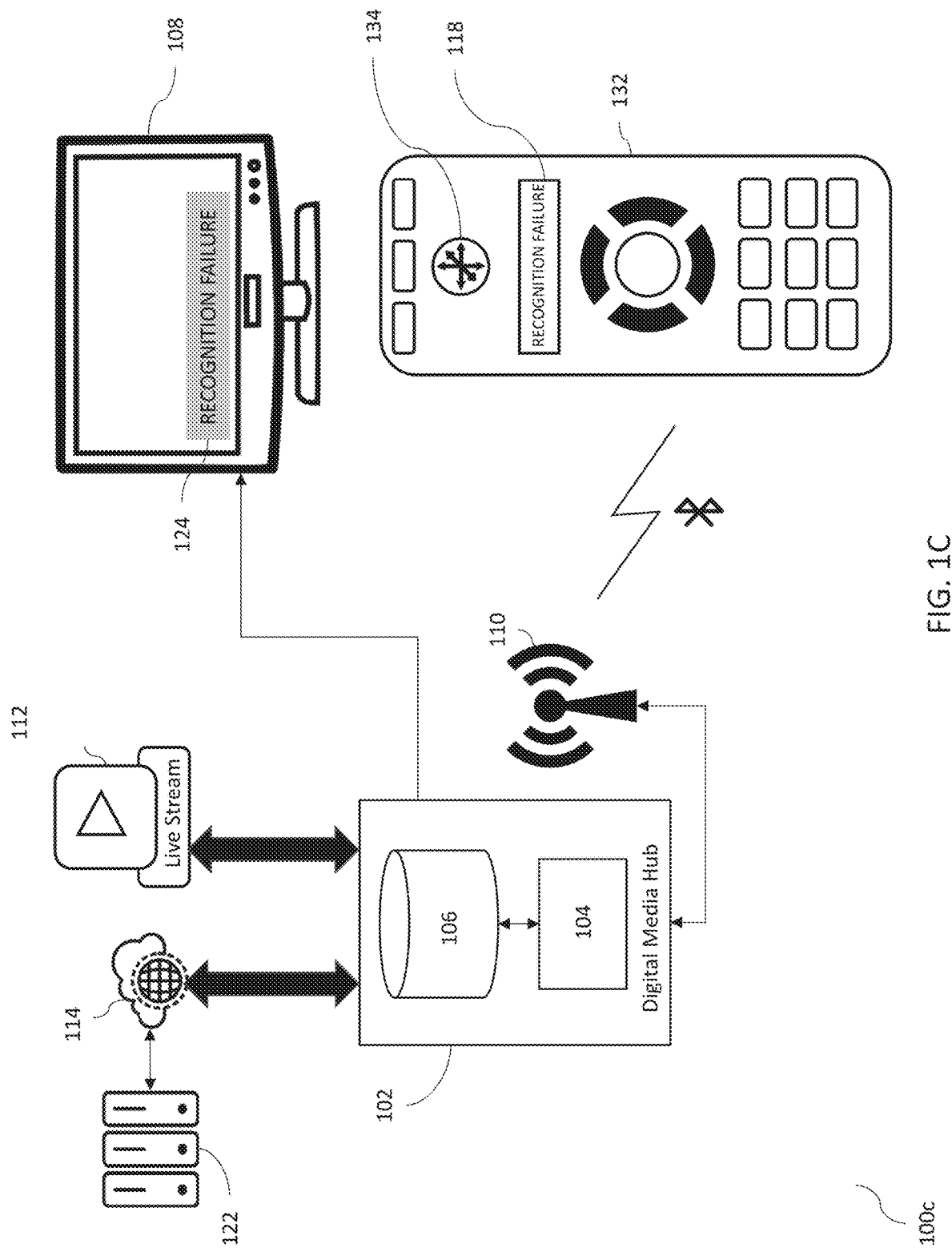
FIG. 1C is a functional block diagram of a system supporting a third preferred embodiment of an enhanced-remote control system utilizing an accelerometer.

FIG. 1C provides a functional diagram depicting a third preferred embodiment of an enhanced-remote control system for use with a digital media controller. Like-numbered elements in system 100c operate in a manner similar to those of the system 100a (see FIG. 1A). However, unlike system 100a, system 100c includes RCU 132 into which 3-axis accelerometer 134 is integrated. Accelerometer 134 generates information indicative of the motion of RCU 134 and wirelessly transmits that information to digital media controller 102 via Bluetooth transceiver 110. A user may make particular hand gestures while holding RCU 134 to indicate one or more characters or commands intended to be communicated to digital media controller 102. Information indicative of that motion is generated by accelerometer 134 and transmitted to digital media controller 102. 3-axis accelerometer technology is well-known in the art and will not be discussed in detail in this description. Processor 104 receives information indicative of the motion of RCU 134. This received information is then processed by system 100c in a manner similar to that in which system 100b processed the motion information, and information indicative of one or more characters and/or commands is made available to processor 104.

Processor 104 then executes the appropriate action or actions in response to this character/command information and system 100c responds to these commands in a manner similar of systems 100a and 100b causing processor 104 then executes the appropriate action or actions. System 100c also can provide a user with feedback regarding the system's failure to recognize a recently analyzed RCU motion in a manner similar to that of system 100*a*.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. For example, the various components and systems of the disclosed embodiments could be interconnected wired or wireless means, regardless of manner in which a particular interconnection was illustrated or described above, or the movement of the RCU could be tracked by various means and methods other than those specifically provided for in above description (utilizing ultrasonics, visible light, etc.) The RCU need not be hand held. The RCU could be attached to user clothing, a wristband, or to a user's extremity. In addition, various components (including the digital media controller, digital television and the RCU) could be located off-site from a user or from one another, with the interconnection to and between such components being achieved via public or private network.

The invention claimed is:

1. A control system for the control of a digital media system, comprising:
   at least one memory storing information associated with at least one of a digital system command and a predetermined character;
   a display screen configured to display digital content to a user;
   a controller communicatively linked to a remote-control unit and configured to interface with a plurality of devices including the display screen,
   wherein the controller includes at least one processor and at least one memory,
   wherein the remote-control unit comprises at least one motion sensor,
   wherein the at least one processor of the controller is configured to:
      receive information from the at least one motion sensor of the remote-control unit, wherein the received information is representative of user motion;
      analyze the received information for character and pattern recognition to determine whether the user motion is indicative of at least one of the digital media system command and the predetermined character stored in the at least one memory of the control system;
      in response to determining that the user motion is indicative of at least one of the digital media system command and the predetermined character, provide the digital media system with information, based at least in part on at least one of an indicated digital media system command and indicated predetermined character, and
      in response to determining that the user motion is not indicative of at least one of the digital media system command and the predetermined character, (i) generate an error message indicating that the user motion was not recognized and prompting the user to reattempt the user motion, and (ii) display, on the display screen, the error message with the digital content presently displayed on the display screen in a picture-in-picture format.

2. The system of claim 1 wherein the predetermined character comprises one of the following:
   an alphanumeric character; and
   a logosyllabic character.

3. The system of claim 1 wherein at least one processor is located remotely from the digital media system.

4. The system of claim 1 wherein the at least one memory stores user-specific information and the provision of information to the digital media system is further based, at least in part on the user-specific information.

5. The system of claim 1 wherein the digital media system comprises at least one of the following:
   a digital set-top box;
   a smart television system; and
   a digital media receiver.

6. The system of claim 1 further comprising at least one graphical user interface.

7. The system of claim 6 wherein the at least one graphical user interface comprises at least one digital television.

8. The system of claim 1 wherein the motion sensor comprises at least one touchpad.

9. The system of claim 8 wherein the motion of the user is motion of at least one finger.

10. The system of claim 1 wherein the motion sensor comprises an accelerometer.

11. The system of claim 10 wherein the motion of the user is motion of a user's extremity.

12. A method for controlling a digital media system comprising the steps of:
   receiving information from at least one motion sensor, wherein the received information is representative of user motion;
   analyzing, by a controller, the received information for character and pattern recognition to determine whether the user motion is indicative of at least one of a predetermined digital media system command and a predetermined character;
   in response to determining that the user motion is indicative of at least one of the digital media system command and the predetermined character, providing, by the controller, the digital media system with information, based at least in part on at least one of an indicated digital media system command and indicated predetermined character,
   in response to determining that the user motion is not indicative of at least one of the digital media system command and the predetermined character, (i) generating, by the controller, an error message indicating that the user motion was not recognized and prompting the user to reattempt the user motion, and (ii) displaying, on a display screen, the error message with the digital content presently displayed on the display screen in a picture-in-picture format.

13. The method of claim 12 wherein the predetermined character comprises one of the following:
   an alphanumeric character; and
   a logosyllabic character.

14. The method of claim 12 wherein the provision of information to the digital media system is further based, at least in part on user-specific information.

15. The method of claim 12 wherein the motion of the user is motion of at least one finger.

16. The method of claim 12 wherein the motion of the user is the motion of an extremity.

17. A control system for the control of a digital media system comprising:
   at least one detector configured to detect motion of at least one remote-control unit based upon a signal emitted from the at least one remote-control unit;

a display screen configured to display digital content to a user;

at least one memory storing information associated with at least one of a digital system command and a predetermined character;

a controller comprising at least one processor and at least one memory, the at least one processor being configured to:

receive information from the at least one detector, wherein the received information is representative of the motion of the remote-control unit;

analyze the received information for character and pattern recognition to determine whether the motion of the remote-control unit is indicative of at least one of the digital media system command and the predetermined character;

in response to determining that the motion of the remote-control is indicative of at least one of the digital media system command and the predetermined character, provide the digital media system with information, based at least in part on at least one of an indicated digital media system command and indicated predetermined character, and in response to determining that the motion of the remote-control is not indicative of at least one of the digital media system command and the predetermined character, (i) generate an error message indicating that the motion of the remote-control were not recognized and prompting the user to reattempt the user motion of the remote-control, and (ii) displaying, on the display screen, the error message with the digital content presently displayed on the display screen in a picture-in-picture format.

18. The system of claim 17 wherein the predetermined character comprises one of the following:
an alphanumeric character; and
a logosyllabic character.

19. The system of claim 17 wherein at least one processor is located remotely from the digital media system.

20. The system of claim 17 wherein the at least one memory stores user-specific information and the provision of information to the digital media system is further based, at least in part on the user-specific information.

21. The system of claim 17 wherein the digital media system comprises at least one of the following:
a digital set-top box;
a smart television system; and
a digital media receiver.

22. The system of claim 17 wherein the emitter emits infrared light.

23. The system of claim 17 wherein the at least one detector comprises at least one camera.

24. The system of claim 17 further comprising at least one graphical user interface.

25. The system of claim 24 wherein the at least one graphical user interface comprises at least one digital television.

26. A method for controlling a digital media system comprising the steps of:

receiving, by a processor, information from at least one detector, wherein the received information is representative of motion of a remote-control unit;

analyzing, by the processor, the received information for character and pattern recognition to determine whether the motion of the remote-control unit is indicative of at least one of a predetermined digital media system command and a predetermined character;

in response to determining that the motion of the remote-control unit is indicative of at least one of the digital media system command and the predetermined character, providing, by the processor, the digital media system with information, based at least in part on at least one of an indicated digital media system command and indicated predetermined character, and in response to determining that the motion of the remote-control is not indicative of at least one of the digital media system command and the predetermined character, (i) generate an error message indicating that the motion of the remote-control were not recognized and prompting the user to reattempt the user motion of the remote-control, and (ii) display, upon a display screen, the error message with the digital content presently displayed on the display screen in a picture-in-picture format.

27. The method of claim 26 wherein the predetermined character comprises one of the following:
an alphanumeric character; and
a logosyllabic character.

28. The method of claim 26 wherein the provision of information to the digital media system is further based, at least in part on user-specific information.

29. The method of claim 26 wherein the at least one detector comprises at least one camera.

30. The method of claim 29 wherein the camera is adapted to track the position of at least one emitter on the remote-control unit.

31. The method of claim 30 wherein the at least one emitter emits infrared light.

* * * * *